United States Patent

Gannaway

[11] 4,350,083
[45] Sep. 21, 1982

[54] HEAT BARRIER FOR REFRIGERATION COMPRESSOR PISTON

[75] Inventor: Edwin L. Gannaway, Adrian, Mich.

[73] Assignee: Tecumseh Products Company, Tecumseh, Mich.

[21] Appl. No.: 191,512

[22] Filed: Sep. 29, 1980

[51] Int. Cl.³ .............................................. F16J 1/00
[52] U.S. Cl. ....................................... 92/238; 92/187
[58] Field of Search ................. 92/186, 187, 238, 239; 123/41.35, 41.39, 193 P

[56] References Cited

U.S. PATENT DOCUMENTS

| | | | |
|---|---|---|---|
| 1,627,719 | 5/1927 | Willis | 92/239 X |
| 1,719,092 | 7/1929 | Taylor | 92/239 X |
| 1,732,361 | 10/1929 | Hartog | 92/238 X |
| 1,779,555 | 10/1930 | Minnick | 123/41.35 |
| 1,953,109 | 4/1934 | Heron | 123/41.16 |
| 2,240,640 | 5/1941 | Ducate | 92/159 |
| 2,514,016 | 7/1950 | Casado | 123/193 CP |
| 2,742,883 | 4/1956 | Smith | 123/41.38 |
| 2,860,934 | 11/1958 | Trevarthen | 92/186 |
| 3,104,922 | 9/1963 | Baster | 92/239 |
| 4,058,104 | 11/1977 | Swoager | 123/193 CP |
| 4,060,059 | 11/1977 | Blaser | 123/568 |
| 4,274,372 | 6/1981 | Kelm | 92/187 X |

FOREIGN PATENT DOCUMENTS 468015 12/1951 Italy ....................................... 92/239

Primary Examiner—Robert G. Nilson
Attorney, Agent, or Firm—Albert L. Jeffers; John F. Hoffman

[57] ABSTRACT

A piston intended for use in refrigeration compressors and other applications wherein a heat barrier is provided in the piston skirt between the head of the piston and the wrist pin. The heat barrier substantially reduces the conduction of heat from the higher temperature piston head to the wrist pin bearing surfaces, which would otherwise result in rapid wear of the wrist pin bearings and ultimate failure of the compressor. The heat barrier preferably comprises a pair of openings extending through the wrist pin bosses in close proximity to the wrist pin holes thereby partially thermally isolating the wrist pin holes from the head of the piston. The openings are spaced on opposite sides of an axial line extending from the piston head to the wrist pin holes so that there remains a bridge of the piston skirt material to provide the necessary support for hydraulic loads that occur when the compressor slugs. The openings in the wrist pin bosses also provide a passage for lubricant which is pumped through them by the ram pressure that is developed on the piston return stroke. The lubricant acts as a cooling medium to cool the wrist pin bearing surfaces.

8 Claims, 6 Drawing Figures

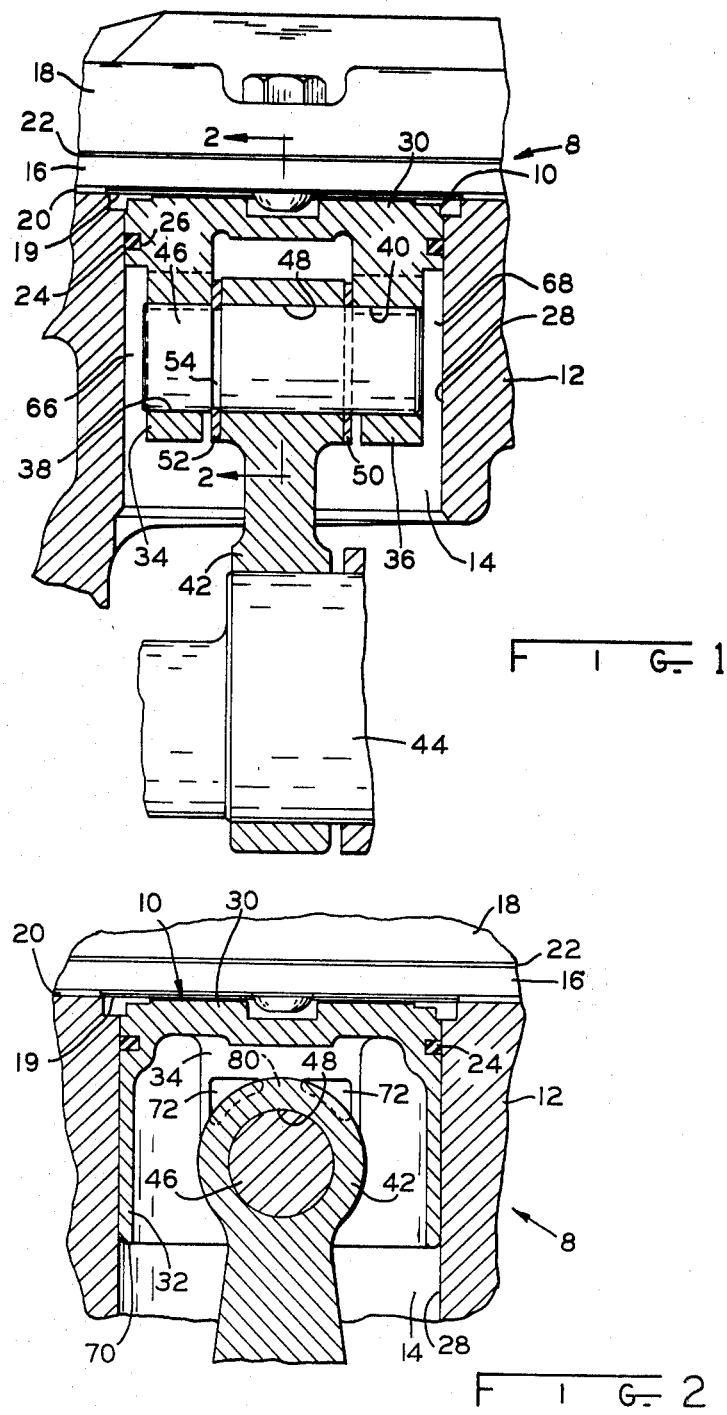

HEAT BARRIER FOR REFRIGERATION COMPRESSOR PISTON

BACKGROUND OF THE INVENTION

The present invention relates to a piston intended primarily for use in refrigeration compressors, but also suitable for other applications.

A significant problem with refrigeration compressors is premature failure due to excessive wear of the wrist pin bearing surfaces. Generally, the piston and connecting rod are connected together by means of a solid or tubular wrist pin which extends through the connecting rod and through aligned openings in the piston skirt. The clearance between the wrist pin and wrist pin openings must be carefully controlled so that an oil film of proper thickness can be maintained. If this thickness should be disrupted, as by excessive wear of the wrist pin holes, localized overheating will occur and failure will ensue.

One of the factors which can lead to excessive and premature wear of the wrist pin bearing surfaces is localized overheating thereof caused by the conduction of heat from the head of the piston. In small compressors, which have a relatively short piston stroke, there is a large reexpansion volume, and the same gas is repeatedly compressed and reexpanded and begins to overheat because it is not pumped out of the cylinder. This heat is transmitted directly to the head of the piston, which is generally made of aluminum or other good thermal conductor, and is conducted along the piston skirt to the wrist pin bearing surfaces. The transfer of heat is enhanced because the wrist pins are normally supported in wrist pin bosses, which are substantially thicker than the remainder of the piston skirt and serve as excellent heat transfer sections.

As the compressor is operated, the temperature of the wrist pin bearing surfaces rises and the viscosity of the oil decreases. At high temperatures, the lubricity of the oil is virtually non-existent, and there is little or no oil film to support the load between the wrist pin and piston on the compression stroke. This results in metal to metal contact and the wrist pin will wear an eliptical hole in the wrist pin boss. Once there is a clearance of several thousandths of an inch, the piston assembly will fail in a matter of a few hours.

A very severe test of a compressor was run wherein the compressor was operated at a very high compression ratio. This produces a large reexpansion volume which results in high temperatures being developed at the head of the piston. The compressor was run for about two hundred hours and oil samples were taken from the compressor to observe any change in color. It was observed that the oil began to discolor at about one hundred and fifty hours indicating that the metal had begun to oxidize, and at two hundred hours the compressor was nearly nonfunctional. Upon examination, the wrist pin bosses were worn into an eliptical shape to such a degree that the compression ratio could not be maintained.

With the heat barrier of the present invention, however, the compressor survived for five hundred hours of operation. The oil remained substantially clean throughout this time, and when the bearing surfaces were analyzed following the test, they evidenced no undue wear.

The partial blockage of heat from the head of the piston to the wrist pin bearing surfaces is accomplished by suitably shaped and located openings extending through the wrist pin bosses. Although prior art pistons have been provided with openings in the piston skirt between the head and the wrist pin holes, they are not shaped or positioned such that they serve as thermal barriers. U.S. Pat. No. 2,514,016, for example, discloses a piston having oblong holes cut in the piston skirt near the head of the piston and oriented such that their longitudinal axes extend in the axial direction of the piston. Because the openings are oriented in this manner and located so close to the piston head, heat is able to flow around the openings and nearly directly to the wrist pin holes. Although these openings assist in enabling lubricant to flow from one side of the piston skirt to the other, they do not serve as a thermal barrier.

In U.S. Pat. No. 1,779,555, a plurality of circumferentially spaced oil passages are provided through the piston skirt between the wrist pin and head of the piston. The passages are so small, however, that their effect in blocking thermal conduction to the wrist pin bearing surfaces is negligible.

SUMMARY OF THE INVENTION

The conduction of heat from the head of the piston to the wrist pin bearing surfaces is greatly reduced by providing one or more openings extending completely through the wrist pin bosses and positioned between the piston head and wrist pin openings. In order to isolate the wrist pin openings to the greatest extent possible, the heat barrier openings are located in close proximity to the wrist pin openings so that the thermal conduction path is interrupted in the area of the wrist pin. Enough material must be left between the wrist pin openings and heat barrier openings, however, to provide the necessary structural support against the load on the wrist pin bosses during the compression stroke of the piston. These openings partially isolate the wrist pin from the heat generated at the head of the piston by lessening the thermal conductivity in direct lines between the piston head and the wrist pin. Thus, much of the heat is diverted from the wrist pin bosses to flow through the remainder of the piston skirt, and is conducted away by the compressor lubricant.

Although a full slot across the top of the wrist pin would provide a nearly optimum heat barrier, account must be taken of the necessity for sufficient structural support to withstand the hydraulic loads that occur during normal operation of the compressor, and particularly when slugging occurs. When a compressor slugs, relatively large amounts of liquid are present within the cylinder, and on the compression stroke, larger than normal hydraulic forces are present. These forces would cause failure of the wrist pin boss due to mechanical overstressing if too much of the wrist pin boss material is removed for the thermal barrier. In order to prevent mechanical overstressing, it has been found desirable to leave a bridge of the wrist pin boss material directly above the wrist pin, which is the area in which the highest mechanical loads occur. Although this does allow some heat transfer directly from the piston head to the wrist pin, it is a narrow thermal section so that most of the heat is channeled to the remainder of the piston skirt and away from the wrist pin itself. It has been found that the use of generally triangular openings wherein the hypotenuse edges are radially closest to the wrist pin opening and follow its contour are the most effective for providing the desired degree of thermal isolation. As discussed earlier, it is important that the heat barrier openings be as close to the wrist pin opening as possible without a loss of structural integrity sufficient to withstand the mechanical loads.

Flats are machined in the outer peripheral surface of the piston skirt directly opposite the wrist pin bosses, and are spaced axially from the head of the piston. The flats extend doen to the edge of the piston skirt so that they form recesses with the cylinder wall. During the return stroke of the piston, ram pressure is developed within these recesses, and this causes oil to flow into the piston through the heat barrier openings. The oil acts as a cooling medium to cool the wrist pin bearing surfaces.

Specifically, the present invention contemplates a piston for use in a refrigeration compressor and in other applications comprising a head, a generally cylindrical and annular piston skirt joined to the head and extending therefrom, a pair of aligned circular wrist pin holes extending through the skirt, and a heat barrier in the piston skirt located between the head and each of the wrist pin holes for blocking a substantial portion of the heat conduction between the head and the respective wrist pin hole. The heat barriers each comprise at least one opening through the piston skirt in close proximity to the respective wrist pin hole.

In preferred form of the invention, each of the barriers comprises two circumferentially spaced openings positioned respectively on opposite sides of an axial line extending from the head of the piston to the wrist pin hole, and the openings are spaced by a narrow bridge of the piston skirt material. It is desirable that the heat barrier openings generally follow the contour of the wrist pin openings and be spaced as closely to them as possible without weakening the structure to the point that the piston could not withstand the hydraulic loads encountered during operation.

It is an object of the present invention to provide a piston having a heat barrier that greatly reduces the thermal conduction path from the piston head to the wrist pin yet does not weaken the piston to the extent that it would be unable to withstand the hydraulic loads encountered during compressor slugging.

It is a further object of the present invention to provide a heat barrier between the piston head and wrist pin which also functions to channel lubricant directly to the wrist pin bosses.

These and other objects of the present invention will be apparent from the detailed description taken together with the accompanying drawings.

BRIEF DESCRIPTION OF THE DRAWINGS

FIG. 1 is a fragmentary sectional view illustrating the piston according to the invention installed in a refrigeration compressor, and drawn approximately to scale;

FIG. 2 is a sectional view taken along line 2—2 of FIG. 1 and viewed in the direction of the arrows;

DETAILED DESCRIPTION

Figure 3:
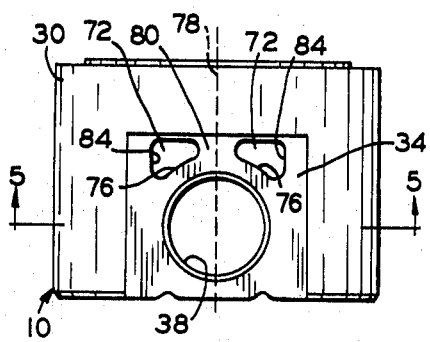
FIG. 3 is an elevational view of the piston.

Referring now to the drawings in detail, FIG. 1 illustrates a compressor 8 provided with a piston constructed in accordance with the present invention. The compressor, which may be any existing prior art compressor, such as the AN5590 compressor manufactured by Tecumseh Products Company, comprises a crankcase 12 having a cylinder bore 14 therein. A valve plate 16 overlies cylinder bore 14 and includes suction and discharge openings (not shown) communicating with suction and discharge chambers (not shown) within head 18. Suction leaf valve 19 is urged against valve plate 16, and gaskets 20 and 22 seal head 18 and valve plate 16. Compressor 8 may be of single cylinder or multiple cylinder design.

Figure 4:
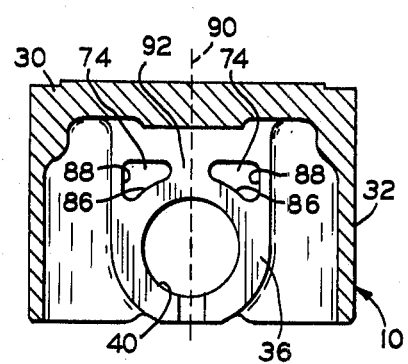
FIG. 4 is a sectional view taken along line 4—4 of FIG. 6 and viewed in the direction of the arrows.
Figure 5:
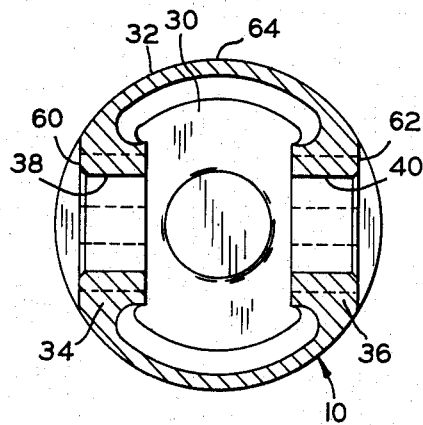
FIG. 5 is a sectional view taken along line 5—5 of FIG. 3 and turned 90° about the axis of the piston.
Figure 6:
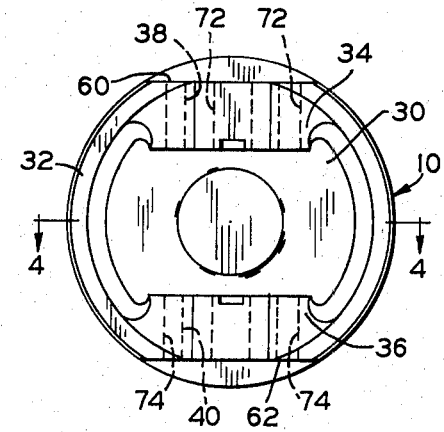
FIG. 6 is a bottom view of the piston.

Piston 10 is received within cylinder bore 14 for reciprocation along the longitudinal axis of bore 14, and includes a seal 24 received within an annular groove 26 and in sliding engagement with the inner wall 28 of cylinder bore 14. Piston 10 is preferably made of aluminum and comprises a head 30 having a generally cylindrical and annular piston skirt 32 (FIG. 5) extending therefrom. Thickened portions of skirt 32 form wrist pin bosses 34 and 36 as best illustrated in FIGS. 4 and 5, and aligned, circular wrist pin openings 38 and 40 extend through bosses 34 and 36, respectively. Openings 38 and 40 are aligned along an axis extending perpendicular to the central axis of reciprocation of piston 10. Piston 10 is driven by means of a connecting rod 42 journaled on crankshaft 44 and connected to piston 10 by steel wrist pin 46. Wrist pin 46 extends through an opening 48 in connecting rod 42 and through the aligned wrist pin openings 38 and 40. Spacers 50 and 52, the latter being received within an annular groove 54 in wrist pin 46, prevent contact between connecting rod 42 and bosses 34 and 36.

Flats or steps 60 and 62 are machined in the outer surface 64 of piston skirt 32 directly opposite bosses 34 and 36, respectively, and these form downwardly opening pockets 66 and 68 (FIG. 1) when piston 10 is received within cylinder 14. It will be noted that flats 60 and 62 are spaced from piston head 30 and extend completely down to the edge 70 of skirt 32 (FIG. 2). The outer edges of wrist pin openings 38 and 40 are slightly chamferred as illustrated in FIG. 5.

As illustrated in FIGS. 3 and 4, the thermal barrier according to the present invention comprises two generally triangular-shaped openings 72 extending completely through boss 34 and two similar openings 74 extending completely through boss 36. The radially inner edges 76 of opening 72, which are the hypotenuse edges, are slightly curved so as to follow the contour of wrist pin opening 38. They are preferably positioned as close to opening 38 as possible without weakening the boss 34 to the point where hydraulic loads cannot be withstood. Openings 72 are positioned on opposite sides of an imaginary axial line 78 extending from the head 30 of piston 10 through the axis of opening 38. This leaves a bridge 80 directly between wrist pin 46 (FIG. 2) and the head 30 of piston 10. It has been found that this is necessary to provide sufficient strength to withstand the hydraulic loads encountered during compressor slugging. The side edges 84 of openings 72 are positioned laterally outward of opening 38.

In a similar fashion, the radially inner edges 86 of opening 74 (FIG. 4) generally follow the contour of wrist pin opening 40, and the side edges 88 are positioned laterally outward of opening 40. Openings 74 are equidistantly spaced on opposite sides of an imaginary center line 90 extending from head 30 down through the axis of opening 40. This leaves a bridge 92 along center line 90 to provide the necessary strength.

Openings 72 and 74 constitute a thermal barrier in that heat from head 30 must pass around them to reach the wrist pin bearing surfaces 38 and 40. This lessens the overall thermal conductivity of bosses 34 and 36 and results in much of the heat flowing through the remainder of the piston skirt 32. Openings 72 and 74 also function as a passage for lubricant from the pockets 66 and 68 (FIG. 1) formed by flats 60 and 62. On the return stroke of the piston, hydraulic ram pressure is developed in pockets 66 and 68, and this forces lubricant through openings 72 and 74 thereby cooling bosses 34 and 36 in the area just above wrist pin 46. Since this is within the thermal path between head 30 and wrist pin 46, cooling of this area will serve to assist in maintaining the temperature of the wrist pin bearing surfaces 38 and 40 within acceptable limits. The lubricant will also assist in cooling the bearing surfaces between connecting rod 42 and wrist pin 46.

It will be noted that the dimensions of openings 72 and 74 in a direction generally tangential to openings 38 and 40 is greater than the dimensions thereof in the axial direction. This shape enables the openings 72 and 74 to provide good thermal isolation without unduly reducing the structural support provided by bosses 34 and 36 in radial directions relative to wrist pin 46. Moreover, the openings 72 and 74 taper toward bridges 80 and 92 thereby providing maximum strength along center lines 78 and 90 where the greatest loading occurs. Alternatively, openings 72 and 74 could be arcuate in shape and concentric with openings 38 and 40.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A piston comprising: a head, a generally cylindrical piston skirt joined to said head and extending axially therefrom, a pair of aligned circular wrist pin holes extending through said skirt, and two heat barrier means in said piston skirt located between said head and the respective wrist pin holes for blocking a substantial portion of the heat conduction from the head to the respective wrist pin holes, each said heat barrier means comprising at least two openings extending completely through the piston skirt in close proximity to the respective wrist pin hole and on opposite sides in the circumferential direction of an axial line intersecting the center of the respective wrist pin hole, each pair of said openings having at least a portion which is positioned axially between the respective wrist pin hole and the piston head, and the openings in each pair being separated by a narrow bridge of the piston skirt that lies along said axial line, said piston skirt including substantially opening-free heat conduction areas between said wrist pin holes and axially extending from the piston head down to an area beyond the wrist pin holes, whereby heat is channeled away from the piston head along a flow path circumferentially spaced from the wrist pin holes.

2. The piston of claim 1 wherein the openings are triangular in shape and each includes an edge nearest the respective wrist pin hole which is longer than any other edge of the respective said opening.

3. The piston of claim 1 wherein said skirt includes a pair of diametrically opposite thickened wrist pin bosses, and said wrist pin holes and said openings extend through said bosses.

4. The piston of claim 3 including a step in a peripheral outer surface of said skirt opposite each of said bosses and facing in a direction generally opposite the piston head.

5. The piston of claim 4 wherein said steps are located only on opposite sides of the piston skirt from the respective bosses.

6. A piston comprising: a head, an annular generally cylindrical piston skirt joined to and extending from said head, said skirt including a pair of diametrically opposite thickened wrist pin bosses, a wrist pin hole extending through each of said bosses, said holes adapted for receiving a wrist pin therein, and a heat barrier means in each of said bosses for blocking a substantial portion of the heat conduction from said head to the respective wrist pin hole, each of said heat barrier means comprising two circumferentially spaced openings in close proximity to the respective wrist pin hole and positioned respectively on opposite sides of an axial line extending from said head to the axis of the respective wrist pin hole; the opening of each barrier means being separated by a narrow bridge of the same material of which the piston skirt is made, and said openings being generally triangular in shape with a radially inner hypotenuse edge which follows the contour of the respective wrist pin hole.

7. A piston comprising: a head, an annular generally cylindrical piston skirt joined to and extending from said head, said skirt including a pair of diametrically opposite thickened wrist pin bosses, a wrist pin hole extending through each of said bosses, said holes adapted for receiving a wrist pin therein, and a heat barrier means in each of said bosses for blocking a substantial portion of the heat conduction from said head to the respective wrist pin hole, each of said barrier means comprising two circumferentially spaced said openings positioned respectively on opposite sides of an axial line extending from said head to the axis of the wrist pin hole, and the openings of each barrier means generally tapering toward the respective axial line and being separated by a narrow bridge of the same material of which the piston skirt is made.

8. A piston comprising: a head, an annular generally cylindrical piston skirt joined to and extending from said head, said skirt including a pair of diametrically opposite thickened wrist pin bosses, a wrist pin hole extending through each of said bosses, said holes adapted for receiving a wrist pin therein, and a heat barrier means in each of said bosses for blocking a substantial portion of the heat conduction from said head to the respective wrist pin hole, each of said barrier means comprising two circumferentially spaced said openings positioned respectively on opposite sides of an axial line extending from said head to the axis of the wrist pin hole, said openings of each barrier means being separated by a narrow bridge of the same material of which the piston skirt is made, and said openings having radially inner edges relative to said wrist pin holes which are arcuate and follow the contour of the respective holes.

* * * * *